(12) United States Patent
Crismore

(10) Patent No.: US 6,348,078 B1
(45) Date of Patent: Feb. 19, 2002

(54) VACUUM CLEANER OUTPUT DUCT EXTENSION

(76) Inventor: Jerry Crismore, 4819 W. Ave. M, Quartz Hill, CA (US) 93536-2908

(*) Notice: Subject to any disclaimer, the term of this patent is extended or adjusted under 35 U.S.C. 154(b) by 0 days.

(21) Appl. No.: 09/575,255

(22) Filed: May 22, 2000

(51) Int. Cl.[7] .............................................. B01D 46/04
(52) U.S. Cl. ........................... 55/361; 55/368; 55/374; 55/DIG. 2; 55/DIG. 3; 15/352
(58) Field of Search ...................... 55/361, 368, 374, 55/375, DIG. 2, DIG. 3; 15/352

(56) References Cited

U.S. PATENT DOCUMENTS

| | | | |
|---|---|---|---|
| 1,802,228 A | | 4/1931 | Witte |
| 1,989,868 A | * | 2/1935 | Kessler .................. 55/DIG. 2 |
| 3,297,233 A | * | 1/1967 | Meyerinefer ............ 55/DIG. 2 |
| 3,322,041 A | * | 5/1967 | Fesco ..................... 55/DIG. 2 |
| 3,535,855 A | * | 10/1970 | Howard et al. .......... 55/DIG. 2 |
| 3,619,989 A | | 11/1971 | Howard et al. |
| 3,676,986 A | * | 7/1972 | Reiling ................... 55/DIG. 2 |
| 3,728,847 A | * | 4/1973 | Howard et al. ......... 55/DIG. 2 |
| 3,790,986 A | | 2/1974 | Burger |
| 4,028,074 A | | 6/1977 | Schaaf |
| 4,119,414 A | | 10/1978 | Smaling |
| 4,262,384 A | | 4/1981 | Bowers |
| 4,514,199 A | | 4/1985 | Ford et al. |
| 4,670,030 A | | 6/1987 | Schultz |
| 4,675,032 A | | 6/1987 | Genovese |

* cited by examiner

*Primary Examiner*—David A. Simmons
*Assistant Examiner*—Minh-Chau T. Pham
(74) *Attorney, Agent, or Firm*—Dennis W. Beech

(57) ABSTRACT

An output duct extension for attachment to an upright vacuum cleaner output sleeve or collar. The output duct extension is constructed to be insertable into the paper fill tube of a disposable paper filler bag. The output duct extension is of a longitudinal length such that when it is inserted into the fill tube and the paper filler bag is contained in a fabric fuller bag of the vacuum cleaner the upper end of the output duct extension is positioned at the approximate top end of the fill tube.

1 Claim, 1 Drawing Sheet

VACUUM CLEANER OUTPUT DUCT EXTENSION

BACKGROUND OF THE INVENTION

1. FIELD OF THE INVENTION

This invention relates to devices used to interface a disposable paper filler bag of a vacuum cleaner with the outlet duct of a vacuum cleaner housing. The new device extends the outlet duct collar or opening from the normal position near the bottom end of the disposable paper filler bag to be at the approximate upper end of a delivery tube.

2. DESCRIPTION OF RELATED ART

There are currently in use a variety of upright vacuum cleaners which use fabric filler bags having a disposable paper filler bag therein. Examples are characterized by U.S. Pat. Nos. 4,514,199 and 4,262,384 issued on Apr. 30, 1985 and Apr. 21, 1981 respectively. Both of the disclosures illustrate use of a non-disposable fill tube to duct the output dirt from the vacuum cleaner housing to the approximate upper end of a disposable paper filler bag.

Another example of such upright vacuum cleaners is U.S. Pat. No. 4,119,414, issued Oct. 10, 1978. In this instance the disposable paper filler bag has an attached delivery tube which interfaces at a lower end with a short sleeve at the vacuum cleaner housing. This simplifies the housing structure yet allows dirt to be ducted and deposited at the approximate upper end of the disposable paper filler bag to prevent clogging. A problem experienced with such a structure involves the rupture or tearing of the paper delivery tube. When this occurs the dirt is thereby allowed to fill the fabric filler bag which then must be cleaned.

The present invention improves the reliability of the integrity of the disposable paper filler bag and attached delivery tube thereby allowing use of such disposable bags without complication the housing delivery sleeve as in U.S. Pat. Nos. 4,514,199 and 4,262,384. A simple output collar or sleeve extension is attached to extend the output duct from the vacuum cleaner housing to the approximate upper end of a paper delivery tube to provide support for the paper delivery tube.

SUMMARY OF THE INVENTION

One object of the present invention is improved integrity of a disposable paper filler bag attached delivery tube. Another object is allowance of modification of existing vacuum cleaner sleeves or collars for extension into paper delivery tubes.

In accordance with the description presented herein, other objectives of this invention will become apparent when the description and drawings are reviewed.

DESCRIPTION OF THE PREFERRED EMBODIMENT

Figure 1:
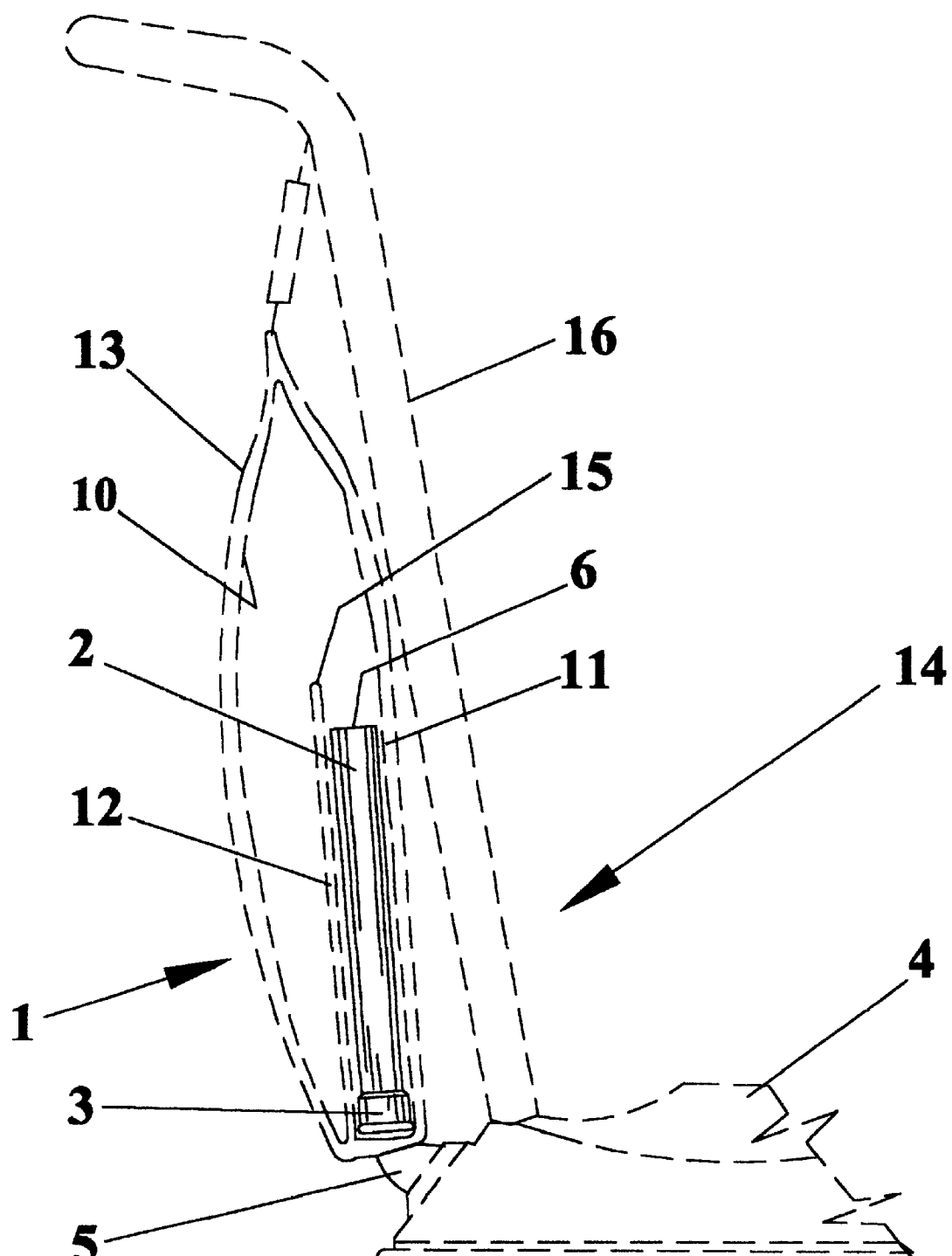
FIG. 1 illustrates a side elevation view of the output duct extension inserted in a paper delivery tube.

The output duct extension (1) is a tube having an attachment mechanism to interface with the output sleeve or collar of a vacuum cleaner housing. For new vacuum cleaners the output duct extension device may be formed as an extension of the sleeve or collar.

Referring to FIG. 1, a tube (2) with a friction fit attachment (3) is inserted onto a vacuum cleaner housing (4) output sleeve (5) or collar. While a tube structure is illustrated, the duct extension (1) may be any shape necessary to accommodate the output sleeve (5) form factor. A push friction fit is illustrated; however, a threaded, compression ring or the like attachment may be used to be compatible with the output sleeve (5).

A disposable paper filler bag (10) having a paper fill tube (11) attached at a front face (12) is inserted in a fabric filler bag (13) of the vacuum cleaner (14). Prior to inserting the paper filler bag (10) the fill tube (11) is inserted over the tube (2). The tube (2) is of a longitudinal length such that the upper end (6) is at the approximate top end (15) of the fill tube (11) when inserted therein. The tube (2) thereby provides a support structure for the paper fill tube (11) to inhibit rupture thereof.

An upright vacuum cleaner (14) as commonly understood has a vacuum cleaner housing (4) in which there are elements such as an intake nozzle, a motor, a fan, a dirt box and other parts which provide the cleaning and intake of dirt or debris which is suctioned up and blown to an output sleeve (5). There is also an attached handle (16). The type of vacuum cleaner (14) for which the output duct extension (1) is intended uses a disposable paper fill bag (10) contained in a fabric filler bag (13) which is attached at the top end to the handle (16) and at the bottom end to the vacuum cleaner housing (4) or output sleeve (5). The fabric filler bag (13) normally has a zippered opening for inserting and removing the paper filler bag (10).

In use with existing vacuum cleaners (14) the output duct extension (1) is attached by appropriate means to the output sleeve (5). A paper filler bag (10) paper fill tube (11) is then inserted over tube (2). The paper fill bag (10) is then inserted and retained in the fabric filler bag (13). When the vacuum cleaner (14) is in operation the exhaust dirt and air pressure travels through tube (2) to the approximate top end (15) to be deposited in the paper filler bag (10). The tube (2) thereby experiences the force that would normally be applied to the paper fill tube (11).

The output duct extension (1) may be fabricated as an integral part of the output sleeve (5) for new fabrication of parts.

While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A device for extending the output duct of a vacuum cleaner for support of an external paper fill tube of a disposable paper filler bag used therewith comprising:

an output duct extension of generally rigid construction attachable to the output duct by a means for attachment, which means for attachment positions the output duct extension in an approximately vertical position;

the output duct extension positioned in a fabric filler bag of the vacuum cleaner such that at an upper end of the output duct extension the external paper fill tube may be installed over and disposed around the output duct extension to inhibit rupture of the external paper fill tube during vacuum cleaner operation and such that the disposable paper filler bag may be enclosed in the fabric filler bag adjacent the output duct extension; and the upper end positioned after installation in the extended paper fill tube at approximately a top end of the external paper fill tube.

* * * * *